United States Patent [19]

Eggers, Jr.

[11] Patent Number: 5,161,952
[45] Date of Patent: Nov. 10, 1992

[54] DUAL-PLANE BLADE CONSTRUCTION FOR HORIZONTAL AXIS WIND TURBINE ROTORS

[75] Inventor: Alfred J. Eggers, Jr., Atherton, Calif.

[73] Assignee: Rann, Inc., Palo Alto, Calif.

[21] Appl. No.: 586,808

[22] Filed: Sep. 24, 1990

[51] Int. Cl.$^5$ .............................................. B63H 1/26
[52] U.S. Cl. .......................... 416/223 R; 416/227 R; 416/227 A; 416/196 A; 416/132 B; 416/DIG. 4
[58] Field of Search .......... 416/223 R, 227 R, 227 A, 416/DIG. 4, 196 A, 132 B; 415/905, 908

[56] References Cited

U.S. PATENT DOCUMENTS

| | | | |
|---|---|---|---|
| 220,083 | 9/1879 | Martin | 416/227 A |
| 1,098,306 | 5/1914 | Trautmann et al. | 416/227 A X |
| 1,338,874 | 5/1920 | Shaffer | 416/227 A X |
| 1,813,877 | 7/1931 | Gunn | 416/227 A X |
| 1,820,529 | 8/1931 | Darrieus | 416/227 A X |
| 2,172,721 | 9/1939 | Wigzell | 416/196 A X |
| 2,273,756 | 2/1942 | Honerkamp | 416/227 A X |
| 2,576,294 | 11/1951 | Geraci | 416/227 A X |
| 4,130,381 | 12/1978 | Levin et al. | 416/227 A X |

FOREIGN PATENT DOCUMENTS

| | | | |
|---|---|---|---|
| 644359 | 7/1962 | Canada | 416/227 |
| 0009767 | 4/1980 | European Pat. Off. | 416/227 A |
| 413534 | 5/1925 | Fed. Rep. of Germany | 416/132 B |
| 3207539 | 9/1983 | Fed. Rep. of Germany | 416/132 B |
| 3331166 | 3/1985 | Fed. Rep. of Germany | 416/227 A |
| 466271 | 2/1914 | France | 416/227 A |
| 383498 | 11/1932 | United Kingdom | 416/227 A |

*Primary Examiner*—Edward K. Look
*Assistant Examiner*—Todd Mattingly
*Attorney, Agent, or Firm*—Flehr, Hohbach, Test, Albritton & Herbert

[57] ABSTRACT

Dual-plant blade construction for wind turbine rotors having a horizontal shaft having a rotor hub adapted to be mounted on the horizontal shaft and having a horizontal axis. First and second sets of straight blades are secured to said rotor hub in circumferentially equally spaced apart positions on the rotor hub. Each of said sets of blades include first and second blades having tip and root portions with the root portions of the blades being secured to the rotor hub at spaced apart positions along the axis of the rotor hub and the tip portions of the blades being secured to each other whereby there is generated substantially equal and opposite cyclic spanwise forces and minimal cyclic flatwise moments in the first and second blades in response to non-steady aerodynamic normal forces acting on these blades in non-uniform turbulent winds.

8 Claims, 2 Drawing Sheets

| MAX. M & Δσ | BLADES ROTATING ($I_{GC}$ = 2/3) | | | BLADES STATIONARY ($I_{GC}$ = 1/2) | | |
|---|---|---|---|---|---|---|
| | GUSTS/VELOCITY GRADIENTS | | | GUSTS/VELOCITY GRADIENTS | | |
| | ⊣ | ◁ | □ | ⊣ | ◁ | □ |
| $\left(\dfrac{M_{OU}}{M_{OM}}\right)_{MAX}$ | 0.044 | 0.071 | 0.083 | 0.054 | 0.053 | 0.079 |
| $\left(\dfrac{\Delta\sigma_{OU}}{\Delta\sigma_{OM}}\right)_{MAX}$ | 0.46 | 0.66 | 0.72 | 0.38 | 0.49 | 0.63 |

DUAL-PLANE BLADE CONSTRUCTION FOR HORIZONTAL AXIS WIND TURBINE ROTORS

FIELD OF THE INVENTION

This invention relates to a dual-plane blade construction for horizontal axis wind turbine rotors, and more particularly to one having a high cycle fatigue life.

BACKGROUND OF THE INVENTION

It has been found that the fatigue lives of larger diameter horizontal axis wind turbine (HAWT) rotor blades are dominated by the combination of mean and cyclic flatwise bending moments and stresses experienced from the application of aerodynamic normal forces during normal operation of the wind turbines. These moments and stresses are most severe at the blade roots, where fatigue failure is most likely to first occur. The non-steady normal forces are the inevitable consequence of turbulent gusts and velocity gradients in the wind.

It is desirable that the blades on such wind turbines survive approximately 1 billion cycles of flatwise bending stresses to make it possible to achieve an approximately 30-year life. In practice, it has been difficult to achieve a small fraction of this goal with wind turbines utilizing monoplane blade configurations. Monoplane blade configurations have typically been the blade configuration of choice for both upwind and downwind rotors. The requirements for retrofit repair and replacement of such rotor blades in large horizontal axis wind turbines used in large wind farms now number in the thousands. There is therefore a need for a new and improved rotor construction which can be utilized for new wind turbine applications, and also which can be used for retrofitting replacement rotors on existing wind turbines.

OBJECTS OF THE INVENTION

In general, it is an object of the present invention to provide a dual blade rotor construction for horizontal axis wind turbines which has a high cycle fatigue life.

Another object of the present invention is to provide a rotor construction of the above character which makes it possible to reduce transient aerodynamic loads, flatwise moments and resulting peak stresses experienced by the rotor blades.

Another object of the present invention is to provide a rotor construction of the above character in which dual blades are utilized.

Another object of the present invention is to provide a rotor construction of the above character in which small gap-to-chord ratios are obtained with blades connected at their tips.

Another object of the present invention is to provide a rotor construction of the above character in which equal and opposite spanwise blade forces are generated in response to aerodynamic normal forces acting on the blades.

Another object of the present invention is to provide a rotor construction of the above character in which external flatwise moments generated at the rotor hub by the aerodynamic normal forces are largely counterbalanced by the internal flatwise couple generated by the equal and opposite spanwise forces in the blades acting across the gap between them at their roots.

Another object of the present invention is to provide a rotor construction of the above character in which cyclic flatwise bending moments and resulting peak stresses are minimized.

Another object of the present invention is to provide a rotor construction of the above character in which aerodynamic interference effects between the dual-plane blades reduce their overall transient response to gusts or other nonuniformities in the wind inflow to the rotor.

Another object of the present invention is to provide a rotor construction of the above character in which either fixed or variable pitch rotors with either rigid or teetered hubs can be provided which can operate either upwind or downwind.

Additional objects and features will appear from the following description, in which the preferred embodiments are set forth in detail in conjunction with the drawings.

SUMMARY OF THE INVENTION

In general, it is an object of the present invention to provide a rotor construction for wind turbines having a horizontal shaft comprised of a rotor hub which is adapted to be mounted on a horizontal shaft and having a horizontal axis of rotation. First and second sets of blades are secured to the rotor hub in circumferentially equally spaced apart positions. Each of the sets of blades includes first and second blades having tip and root portions, means securing the root portions of the blades to the rotor hub at spaced apart positions along the axis of the hub. Means are provided for securing the tip portions of the first and second blades to each other. The first and second blades have small gap-to-chord ratios and generate substantially equal and opposite spanwise blade forces in response to aerodynamic normal forces acting on the first and second blades.

DESCRIPTION OF SPECIFIC EMBODIMENTS OF THE INVENTION

Figure 1:
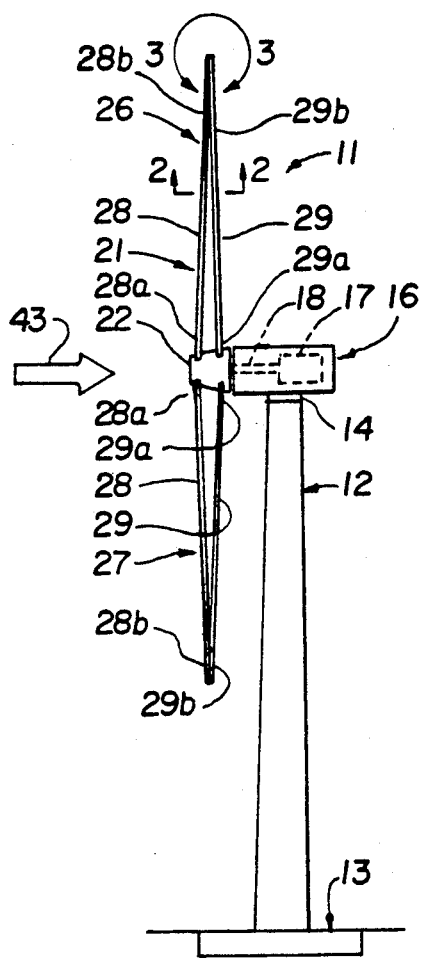
FIG. 1 is a side elevational view of a horizontal axis wind turbine having a rotor construction incorporating the present invention in which dual blades are utilized.

More particularly, as shown in FIG. 1, a wind turbine 11 is provided which incorporates the present invention. It is comprised of a tower 12 mounted upon a foundation 13. The tower 12 can extend to a suitable height, as for example 50 to 200 feet. A yaw drive 14 is mounted on the upper extremity of the tower 12 and has mounted thereon a nacelle 16 which serves as a housing for a generator 17. The generator is provided with a horizontal high-speed shaft 18 extending along a horizontal axis which is driven through a gear box (not shown) by a low-speed shaft (not shown) extending along a horizontal axis and connecting to the rotor hub 22.

A dual-plane blade rotor construction 21 which incorporates the present invention is mounted upon the rotor hub 22. The rotor hub 22 is adapted to be mounted on the shaft 18. The rotor hub 22 is provided with a horizontal axis which is in alignment with the horizontal axis of the shaft 18. The first and second sets 26 and 27 of blades are secured to the rotor hub 22 and are equally spaced circumferentially about the rotor hub 22. Thus, as shown, the two sets 26 and 27 are spaced apart equally by 180° so that they extend diametrically of the rotor hub 22.

It should be appreciated that additional sets of blades, or just one set of blades plus mass balance, in accordance with the present invention can be provided. As for example three sets can be provided which are equally spaced apart circumferentially by 120°. Still more sets of blades can be provided, if desired, and equally spaced appropriately circumferentially of the rotor hub 22.

Figure 2:
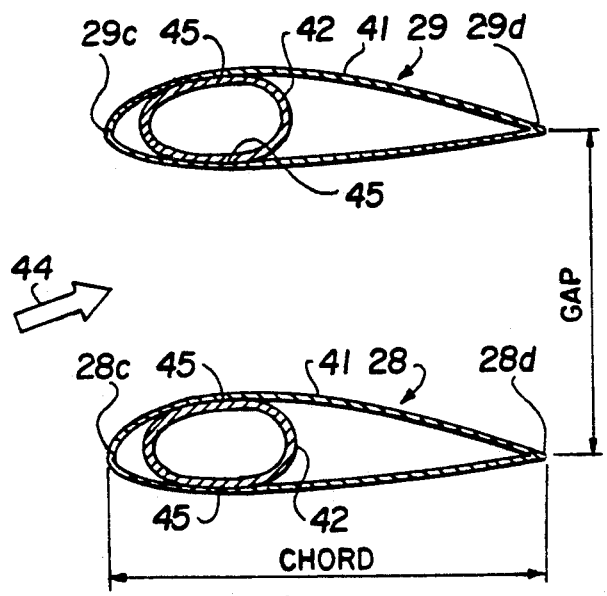
FIG. 2 is an enlarged cross sectional view taken along the line 2—2 of FIG. 1.

Each of the sets of blades 26 and 27 consists of first and second blades 28 and 29. The blades 28 and 29 are provided with root portions 28a and 29a and tip portions 28b and 29b. The root portions 28a and 29a of the blades 28 and 29 are mounted upon the rotor hub 22 in spaced apart positions along the axis of the hub to provide a predetermined gap therebetween. The gap is chosen to provide a small gap-to-chord ratio, as for example zero at the tip and ranging from 0.25 to 3.5 at the root. By way of example, a ratio of 0.7 can be provided for the gap-to-chord ratio, in which case the gap is 30% less than the chord of the blades 28 and 29 at the mid-span position where the cross section of FIG. 2 is taken.

Figure 3:
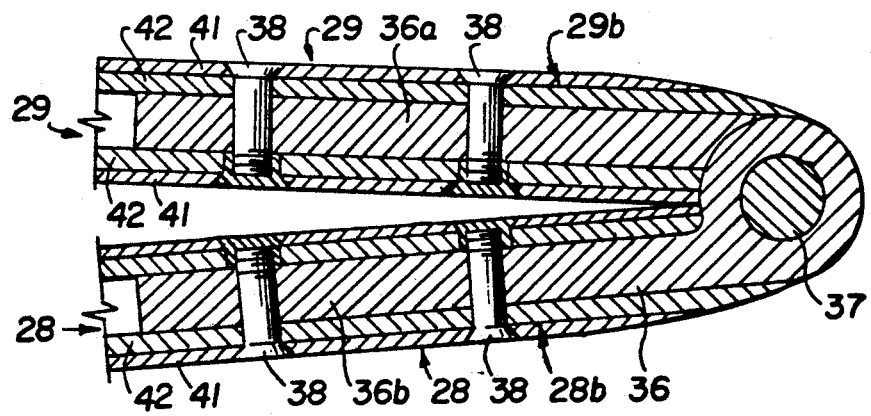
FIG. 3 is an enlarged detail cross sectional view of the dual blade tip construction shown in FIG. 1 encircled by the line 3—3 and taken along the line 3—3 of FIG. 2.

The tip portions 28b and 29b of the blades 28 and 29 are interconnected by suitable means such as a piano-type hinge 36 as shown in FIG. 3. The hinge 36 is provided with leaves 36a and 36b which are hinged together by a shear pin 37. The leaves 36a and 36b are secured to the tips 28b and 29b of the blades 28 and 29 by suitable means such as flush head bolts 38 as shown in FIG. 3. The blade flatwise bending moments are zero at the tips of the blades 28 and 29. By providing such an interconnection at the tips of the blades 28 and 29 equal and opposite spanwise blade forces are generated in response to the aerodynamic normal forces acting on the blades 28 and 29 with the blades facing upwind or downwind. The external flatwise moments generated at the rotor hub by these normal forces are largely counterbalanced by the internal flatwise couple generated by the spanwise forces in the blades acting across the gap between them at their roots where they connect with the rotor hub 22. The cyclic flatwise bending moments and resulting peak stresses on the blades 28 and 29 are minimized at their root joints with the rotor hubs. The aerodynamic interference effects between the blades 28 and 29 reduce their overall transient response to gusts or other nonuniformities in the wind inflow to the rotor 21.

It should be appreciated that a rotor construction of the present type can also be employed with a fixed-tip connection, in which case a rigid yoke replaces the hinge 36 in FIG. 3 and this yoke is connected to the blade tips in the same manner as the hinge in FIG. 3.

It should be further appreciated that a rotor construction of the present type can be employed with either fixed or variable pitch rotor blades, with either rigid or teetered rotor hubs and can be designed to operate either upwind or downwind of the tower. In addition, it should be appreciated that the blades can be provided with tip extensions, ailerons or spoilers for aerodynamic control of the rotor.

The blades 28 and 29 of each set can be constructed in a conventional manner and can have a geometry such as that shown in cross section in FIG. 2. The blades in cross section have conventional airfoil designs having rounded leading edges 28c and 29c, and sharp trailing edges 28d and 29d. The blades are provided with outer shells 41 and interior 0-spars 42 formed of a suitable material such as a fiberglass composite. The shell and spar are bonded together where they interface 45 with a suitable high-strength glue.

The blades 28 and 29 are generally straight and generally have an in-line relationship, i.e., they are not staggered. They also have no decalage. However, in certain HAWT applications it may be desired to use curved, staggered or offset blades with or without decalage. Also, the blades may be provided with predetermined twist and taper as desired.

In operation of the wind turbine 11, the rotor construction 21 is faced into the wind having a direction as indicated by the arrow 43 in FIG. 1. Upon rotation of the rotor construction 21 by the wind impinging upon the blades 28 and 29, a relative wind direction is created as represented by the arrow 44 in FIG. 2. The relative wind direction is the resultant wind direction from the wind inflow velocity and the angular velocity of the dual bladed rotor 21.

Figures 4, 5:
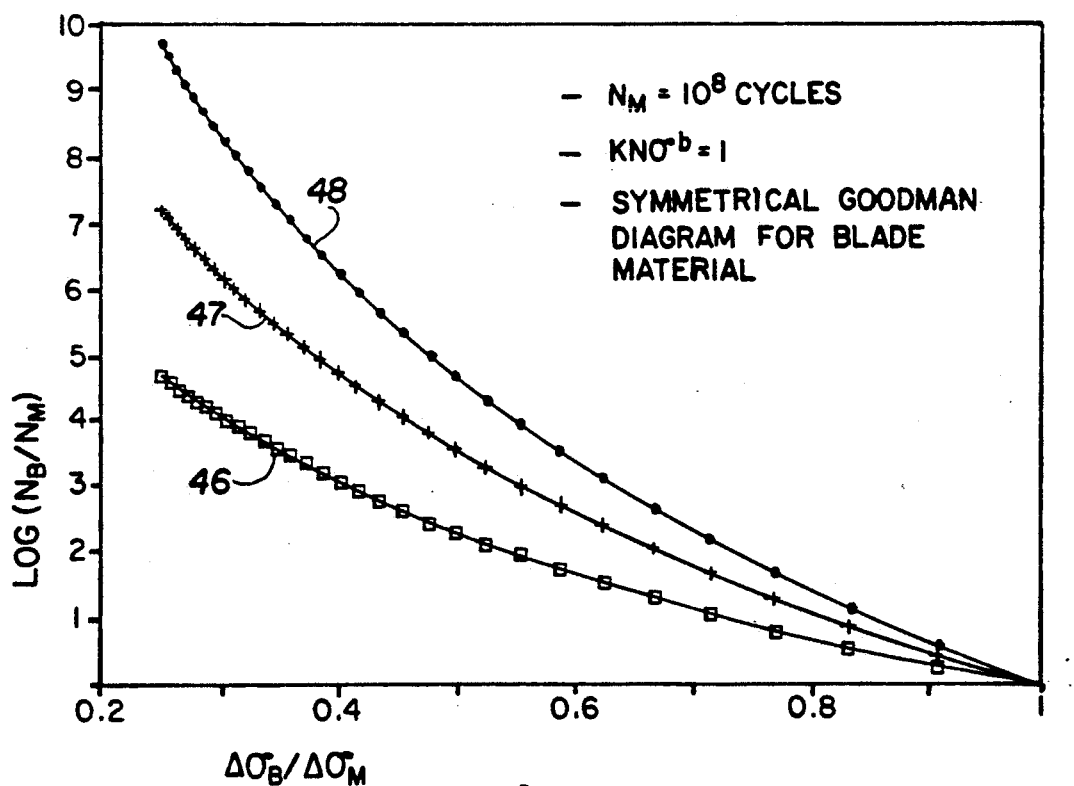
FIG. 4 is a chart of maximum normalized blade root moments and stresses due to various types of gusts/velocity gradients in the wind inflow to a rotor construction of the present invention and compared to a conventional rotor construction utilizing single or monoplane blades.
FIG. 5 is a graph showing the normalized effects of cyclic stress magnitude on high cycle fatigue life comparing a rotor construction utilizing dual-plane blades of the present invention with a rotor construction using conventional monoplane blades operating at the same mean stress levels.

In FIG. 4 there is shown a table which gives maximum normalized dual-plane blade root moments of a rotor construction incorporating the present invention, and peak stresses for various types of gusts/spanwise velocity gradients in which the dual blades of the rotor structure are fixed at the roots and pinned at the tip. The results shown in FIG. 3 are based on computer calculations using well established aerodynamic and structural principles. The symbol "M" denotes flatwise moments. The symbol "$\Delta\sigma$" denotes peak cyclic stress due to these moments. The subscript "$_{OM}$" denotes the root of a monoplane blade operating in the same wind at the same power level as the dual blades. The subscript "$_{OU}$" denotes the root of an upwind dual-plane blade. The dual-plane blades have a ratio of blade thickness to root gap of 0.15, a blade chord to root gap ratio of 1.0, and a blade gap to span ratio of 0.05. These are representative values for larger blades.

The dual-plane blades 28 and 29 have the same total weight, length, chord, thickness ratio per blade, and blade rpm as the monoplane blades with which they are compared. Both types of blades are coned slightly downwind to eliminate flatwise moments when the wind inflow is uniform. All flatwise moments are therefore due to the gusts/velocity gradients in the wind, and the peak stresses in the dual-plane blades are highest at the root of the upwind blade. The peak stresses in the monoplane blade are always at the root. It is clear from FIG. 4 that the dual-plane blades experience moments more than ten fold lower than the monoplane blade, and the peak stresses are from 30% to 50% lower. When the blades are stationary, these reductions are even higher for the dual-plane blades. The values of the aerodynamic interference factor, $I_{GC}$, which are less than 1, contribute importantly to these reductions.

In FIG. 5 there is a graph showing the normalized effects of cyclic stress magnitude on high cycle fatigue life in comparing a monoplane blade with a dual blade rotor construction incorporating the present invention operating at the same mean stress levels. "$N_M$" and "$N_B$" are the fatigue lives in cycles to failure of the monoplane and dual-plane blades, respectively. "$\sigma$" is the mean stress level, and the exponent "b" in the classic fatigue life relationship, $KN\sigma^b=1$, is determined by the blade material comprised in the construction. A value of b=8 is at the low end of acceptable levels for rotor blade materials of construction. It is clear from the curve 46 of FIG. 5 that even at this low value of b, a 30% reduction in peak cyclic stress can increase high cycle fatigue life by ten fold, and a 50% reduction in peak cyclic stress increases this life by one hundred fold. With a medium value of b=13 (curve 47 in FIG. 5), and with a high value of b=18 (curve 48 in FIG. 5), it is clear that still more remarkable increases in fatigue life are obtained for a dual-plane blade rotor construction incorporating the present invention as shown in FIG. 5. The high value of b=18 would correspond, for example, to a fatigue resistant material like a graphite epoxy composite.

These increases in fatigue life achieved by using this present invention, namely the dual-plane blade rotor, are of the magnitude required to achieve the billion cycle, 30-year life objective of rotors for large horizontal axis wind turbines. The effect of favorable aerodynamic interference to reduce dual blade rotor response to gust/velocity gradients in the wind turbine also significantly reduce cyclic loads and stresses in other major wind turbine components including drive train, attitude control systems and towers. These reductions will correspondingly increase the fatigue lives of these components and thereby reduce the cost of electricity generated by the wind turbines.

From the foregoing it can be concluded that the dual-plane blade rotor construction of the present invention provides a major increase in high cycle fatigue life for rotor constructions for horizontal axis wind turbines, particularly those of large size. This result is achieved because the dual-plane blades joined at their tips are aerodynamically softer and structurally stronger in carrying transient aerodynamic normal forces on the outboard portions of the blades. The aerodynamic softening of the dual-plane rotor loads because of their small gap-to-chord ratios equates to reduced transient loads and stresses throughout the entire wind turbine.

What is claimed is:

1. In a dual-plane blade construction for wind turbine rotors having a horizontal shaft, a rotor hub adapted to be mounted on the horizontal shaft and having a horizontal axis, first and second sets of blades secured to said rotor hub in circumferentially equally spaced apart positions on the rotor hub, each of said sets of blades including first and second blades being free of abrupt changes in shape and having substantially straight and unstaggered spanwise axes and having tip and root portions, said root portions having blade chords in their planes of rotation, means securing the root portions of the first and second blades to the rotor hub at spaced apart positions along the axis of the rotor so that the blade chords are substantially perpendicular to the axis of the rotor hub so that the blades are joined smoothly at the rotor hub to provide a gap between the blades and means securing the tip portions of the first and second blades to each other so there is substantially no gap between the blades at the tip portions, the gap between the root portions of the blades extending to the tip portions of the first and second blades being free of obstructions and decreasing substantially linearly from the root portions to the tip portions so that there are generated substantially equal and opposite cyclic spanwise forces and minimal cyclic flatwise moments and stresses in the first and second blades in response to non-steady aerodynamic normal forces acting on the first and second blades from the tips to the roots in non-uniform turbulent winds.

2. A construction as in claim 1 wherein said first and second blades of each set have a gap-to-chord ratio ranging from zero to 3.5.

3. A construction as in claim 1 wherein the means securing the tip portions of the first and second blades to each other comprises a pin-type connection.

4. A construction as in claim 1 wherein the means securing the tip portions of the first and second blades to each other comprises a fixed-type connection.

5. A construction as in claim 1 wherein the first and second blades of each set are in alignment.

6. A construction as in claim 1 wherein the first and second sets of blades are spaced 180° apart.

7. In a dual plane blade construction for wind turbine rotors having a horizontal shaft, a rotor hub adapted to be mounted on the horizontal shaft and having a horizontal axis, at least one set of blades secured to said rotor hub, each of said sets of blades including first and second blades being free of abrupt changes in shape and having substantially straight and unstaggered spanwise axes and having tip and root portions, said root portions having blade chords in their planes of rotation, means securing the root portions of the first and second blades to the rotor hub at spaced apart positions along the axis of the rotor so that the blade chords are substantially perpendicular to the axis of the rotor hub so that the blades are joined smoothly at the rotor hub to provide a gap between the blades and means securing the tip portions of the first and second blades to each other so there is substantially no gap between the blades at the tip portions, the gap between the root portions of the blades extending to the tip portions of the first and second blades being free of obstructions and decreasing substantially linearly from the root portions to the tip portions so that there are generated substantially equal and opposite cyclic spanwise forces and minimal cyclic flatwise moments and stresses in the first and second blades in response to non-steady aerodynamic normal forces acting on the first and second blades from the tips to the roots in non-uniform turbulent winds.

8. In a dual-plane blade construction for wind turbine rotors having a horizontal shaft, a rotor hub adapted to be mounted on the horizontal shaft and having a horizontal axis, a plurality of sets of blades secured to said rotor hub in circumferentially equally spaced apart positions on the rotor hub, each of said sets of blades including first and second blades being free of abrupt changes in shape along substantially straight and unstaggered spanwise axes and having tip and root portions, said root portions having blade chords in their planes of rotation, means securing the root portions of the first and second blades to the rotor hub at spaced apart positions along the axis of the rotor so that the blade chords are substantially perpendicular to the axis of the rotor hub so that the blades are joined smoothly at the rotor hub to provide a gap between the blades and means securing the tip portions of the first and second blades to each other so there is substantially no gap between the blades at the tip portions, the gap between the root portions of the first and second blades extending to the tip portions of the blades being free of obstructions and decreasing substantially linearly from the root portions to the tip portions so that there are generated substantially equal and opposite cyclic spanwise forces and minimal cyclic flatwise moments and stresses in the first and second blades in response to non-steady aerodynamic normal forces acting on the first and second blades from the tips to the roots in non-uniform turbulent winds.

* * * * *

UNITED STATES PATENT AND TRADEMARK OFFICE
CERTIFICATE OF CORRECTION

PATENT NO. : 5,161,952
DATED : Nov. 10, 1992
INVENTOR(S) : Eggers, Jr.

It is certified that error appears in the above-identified patent and that said Letters Patent is hereby corrected as shown below:

In the first line of the Abstract cancel "Dual-plant" and substitute therefore --Dual-plane--.

Signed and Sealed this

Twenty-sixth Day of October, 1993

Attest:

BRUCE LEHMAN

*Attesting Officer*     *Commissioner of Patents and Trademarks*